Feb. 24, 1959 A. P. KRUPER ET AL 2,875,375

APPARATUS FOR REDUCING CONTROL CURRENT FOR PICTURE TUBE EMPLOYING MULTIPLE DEFLECTION

Filed June 4, 1953

WITNESSES:

Robert C. Baird

Leon M. Garman

INVENTORS

Andrew P. Kruper &

Theadore Miller.

BY

F. E. Browder

ATTORNEY 2,875,375
Patented Feb. 24, 1959

2,875,375

APPARATUS FOR REDUCING CONTROL CURRENT FOR PICTURE TUBE EMPLOYING MULTIPLE DEFLECTION

Andrew P. Kruper, Pittsburgh, Pa., and Theadore Miller, Los Angeles, Calif., assignors to Westinghouse Electric Corporation, East Pittsburgh, Pa., a corporation of Pennsylvania Application June 4, 1953, Serial No. 359,626

4 Claims. (Cl. 315—21)

Figure 1:
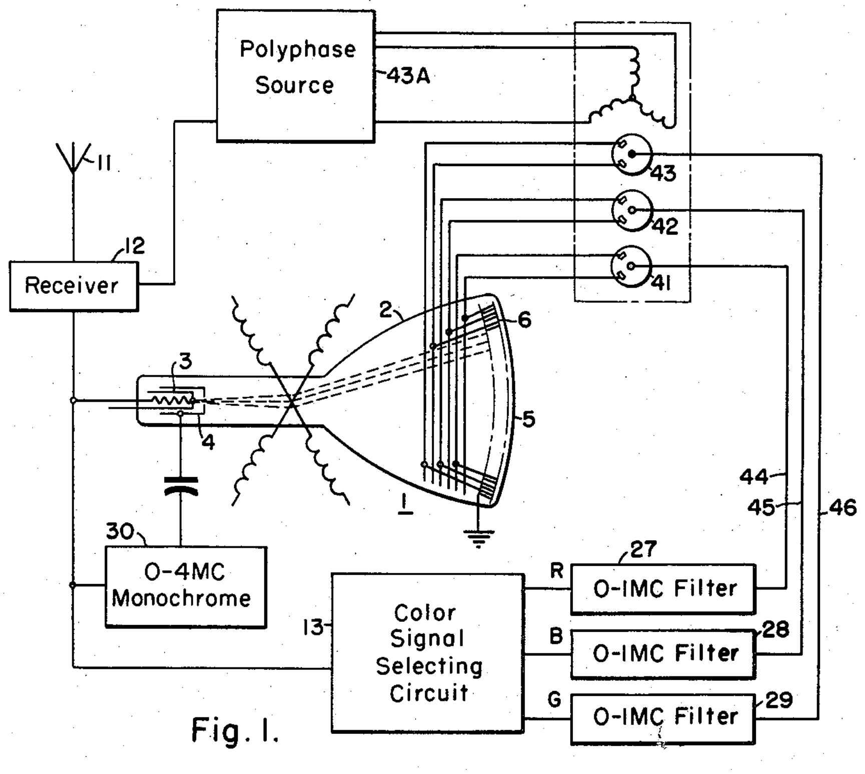

Our invention relates to color television receivers and in particular relates to color television receiver picture screens comprising parallel strips of phosphor subdivided into groups of three which fluoresce in red, blue and green light.

While it has been proposed to reproduce color pictures on screens, such as have just been described, by focusing one or more electron guns so finely that the beam scans and excites only one phosphor strip at a time, this poses a problem in gun design and operation, in the case of pictures having the number of lines per inch conventional in present television, which is so difficult as possibly to be impracticable for commercial production. One way of avoiding the need for such excessively fine focusing has been described in Miller application Serial No. 295,675, filed June 26, 1952, for Television Picture Tube, and Kruper application Serial No. 293,534, filed June 14, 1952 and now abandoned, for Construction of Three Color Tube Screen, which show and claim certain subject matter herein disclosed.

In the system disclosed in that application, the scanning beam is wide enough to cover an entire group of red, blue and green emitting strips, but in the space immediately in front of each strip and perpendicular to it are positioned a pair of metal strips on which is impressed electric potentials from an external control circuit. The potentials are controlled to repel the electrons of the scanning beam from all but one strip of the group at any one time. Thus, when a red picture field is being transmitted to the receiver, the scanning beam is repelled from incidence with the blue and green emitting phosphor strips and exictes the red emitting strip only. When a blue picture field is being transmitted, the scanning beam excites only the blue emitting strips, and so on.

The receiver and picture reproducing tubes described in the above-mentioned applications are likewise applicable to the National Television Standards Committee (hereinafter called NTSC) system of color television, a description of which appears at page 88 of the February 1952 number of "Electronics," published by McGraw-Hill Publishing Co., New York City. While in this NTSC system the color signals are impressed continuously, and not in sequence, on the means controlling the cathode ray beams which generate the picture light on the picture screen, faithful reproduction requires potential fluctuations in the order of hundreds of thousands per second in the agency modulating these cathode ray beams.

However, while the Miller arrangement is entirely operative, the agency by which it modulates the cathode ray beam is a set of control strips covering substantially the entire area of its output screen and connected in multiple with each other, and the impression on the control strips, in the case of either the NTSC system or the precise arrangements described in the Miller and the Kruper applications, of potentials sufficient to control a strong electron beam results, at the frequencies required for conventional pictures, in an undesirably large capacitive current flow to the control strips. Our invention provides a means by which the size of this capacitive current is reduced to easily tolerable values as will be described below.

One object of our invention is to provide an improved color television picture reproducing tube and system.

Another object is to provide an improved color picture screen and scanning beam control therefor.

Yet another object is to provide a multicolor strip screen for picture reproducing having means of a novel character for exciting the fluorescent color to correspond with incoming picture signals.

Still another object is to provide means for reducing the capacitive current in color picture screens of the type which employ local electric gradients along the screen surface to determine the screen areas stimulated by the scanning beam.

Figure 2:
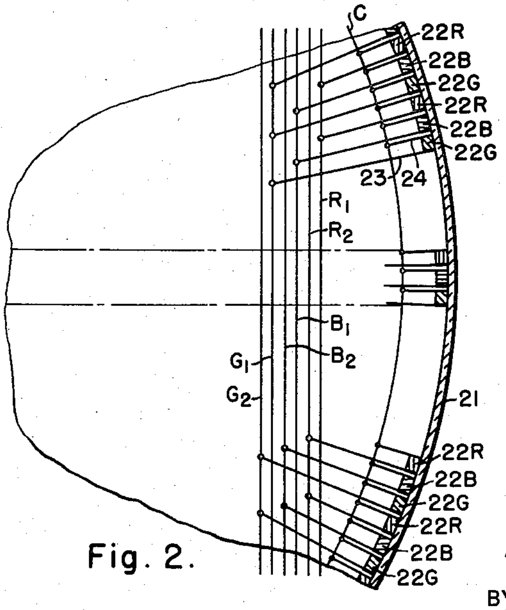

Other objects of our invention will become apparent upon reading the following description taken in connection with the drawings in which Fig. 1 is a schematic view of a color television picture receiver embodying our invention, and Fig. 2 is a schematic diagram of the screen and its control-electrode structure to larger scale.

Referring in detail to the drawings, the picture-receiving tube 1 comprises a vacuum-tight container 2 of conventional outline having an electron gun 3 of usual type with a control electrode 4 which may be modulated with a broadcast picture signal. At the opposite end of the tube is a glass screen 5 which the electron beam from the electron gun 3 is caused to scan by deflection coils in the usual fashion in a series of parallel transverse paths starting each frame at the top of the picture raster and ending it at the bottom. If the incoming picture signal is suitably modulated in ways well known in the television art, the screen 5 may be subjected to interlaced scanning, if desired. In front of the screen 5 and in the path of the beam from the electron gun 3 is a color-control electrode 6 which is shown in more detail in Fig. 2. The electrode 6 is divided into sections, each made up of the same number of groups of three adjacent electrodes which respectively control a red, a blue and a green phosphor strip. For clarity only two sections are shown in Figs. 1 and 2, it being understood that in actual practice the control electrodes for some fifteen hundred phosphor strips constituting a picture screen are divided into as many sections as are necessary to keep the capacitance per section down at a low value. Thus, in Fig. 2 the first section comprises the control electrodes covering the upper six phosphor strips (i. e. two groups each comprising a red 22R, a blue 22B and a green 22G phosphor), the plates 23 controlling all red strips 22R of the section being connected to a bus $R_1$, the plates 23 controlling all blue strips 22B of the section being connected to a bus $B_1$, and all plates 23 controlling green strips 22G being connected to a bus $G_1$. The plates 24 for all phosphor strips on the screen are connected to a common bus C.

The second section of the control electrode is shown for clarity as comprising the six phosphor strips 22R, 22B and 22G appearing at the bottom of the screen in Fig. 2, and in this section all plates 23 for red phosphor strips 22R are connected to a bus $R_2$, all plates 23 of the section which control blue phosphor strips 22B are connected to a bus $B_2$, and all plates 23 of this section which control green phosphor strips 22G are connected to a bus $G_2$.

It will thus be apparent that each section of the fluorescent screen 5 has its own set of three control leads (one for red, one for blue, one for green). The buses $R_1$, $R_2$, etc., of the various sections are respectively connected to output electrodes of an electron-beam switch tube 41. Similarly the buses $B_1$, $B_2$, etc., of the various sections lead to output electrodes of a switch tube 42 and the buses $G_1$, $G_2$, etc., are connected to the output electrodes of a switch tube 43. The switch tubes 41, 42 and 43 are illustrated as having only two output electrodes consistently with the showing of only two sections of the screen 5 and two sets of control buses but it is to be understood that in actual practice each switch tube has as many output electrodes as there are sections of the control electrodes.

The switch tubes 41, 42 and 43 each has an input electrode which may be put into electrical connection with any one of the above-mentioned output electrodes by directing an electron stream to bridge the gap between the input electrode and the selected output electrode. Each of the switch tubes 41, 42, 43 is in effect a multi-throw switch capable of connecting an input channel to any selected one of a plurality of output channels. The detailed structure of suitable switch tubes for such use are shown in an article entitled "Electrostatically Focused Radial Beam Tube" by A. M. Skellet on pages 1354–1357 of the Proceedings of the Institute of Radio Engineers for 1948 published in New York City, and also in an article "The Magnetically Focused Radial Beam Vacuum Tube" in Bell System Technical Journal, vol. 23, pages 190–202 by the same author. Polyphase current for rotating the electron stream in these tubes is derived from a source 43A which is synchronized with the vertical sweep oscillator in receiver 12. Another switch tube that would be suitable is described by Jonker et al. in an article entitled "New Electronic Tubes Employed as Switches in Communication Engineering," Philips Technical Review, vol. 13, page 85, published by North American Philips Co., New York City.

The input electrode of switch tube 41 is connected to a channel 44 which transmits signals modulated in correspondence with the red coloration of the televised picture coming into the receiver; switch tube 42 is connected to a channel 45 which transmits signals corresponding to the blue coloration of the incoming picture, and switch tube 43 to a channel 46 carrying the information corresponding to the green picture coloration. A number of different television systems have been described in which separate channels, such as 44, 45 and 46, carry the modulations corresponding to the red, blue and green light in the picture and any of these may be used to energize those channels.

The switch tubes 41, 42, 43 are controlled to switch the color signals in channels 44, 45 and 46 corresponding to the first few lines of an incoming picture onto the $R_1B_1G_1$ bus, then to switch the color signals in those channels corresponding to the next few lines of the picture onto the $R_2B_2G_2$ bus, and so on down the picture until its entire area has been covered. Such switching may be effected, for example, by sweeping the electron beam around the successive output electrodes in switch tubes 41, 42, 43 by means of a rotating field synchronized with the vertical sweep generator in the receiver so that the electron beam covers the output electrodes during one vertical down sweep of the scanning beam.

While, as stated above, the arrangement thus far described may be used with any television receiver circuit having separate channels like 44, 45, 46 carrying the red, blue and green color signals, such as a "by-passed monochrome" or "mixed highs" transmission described in an article "Mixed Highs in Color Television" by A. V. Bedford, Proceedings of the Institute of Radio Engineers, vol. 38, pages 1003 to 1009, we show in Fig. 1 as one typical instance the circuits for the NTSC system mentioned above. Thus, the signal coming into the antenna 11 in Fig. 1 is demodulated in receiver 12 producing an output band of about 0–4 mc. which is impressed on the control electrode 4 of receiver tube 1 and on a color signal selector circuit 13. At the transmitter, a carrier wave is modulated with information specifying the monochromatic intensity of a picture while a sub-carrier specifies the intensities of the primary colors, red, blue, and green. The receiver 12 produces an output signal proportional to the monochrome of the picture and impresses it on the control grid 4 of picture tube 1. The receiver, with color selector 13 and filters 27, 28, 29, derives from these carriers three signal voltages proportional to the red, the blue and the green light in the picture. These three signal voltages are impressed on the input electrodes of switch tubes 41, 42, 43.

The switch tubes 41, 42, 43 connect the red signal to plates which control the intensity with which electrons in the scanning beam bombard red emitting phosphors on output screen 6, and similarly for the blue and green color signals, as described below.

The screen 5 and electrode 6 are shown in more detail in Fig. 2. Screen 5 consists of a transparent conductive layer 21 on which are supported parallel strips 22 of phosphor subdivided into groups of three, red-emitting, 22R, blue-emitting, 22B and green-emitting, 22G. There may for most purposes suitably be a total of around 1500 such strips running horizontally on a picture about 14 inches high.

The control electrode 6 consists of thin conducting plates 23 and 24, having one edge embedded in the glass wall of screen 5, on each side of the red, blue and green phosphor strips; plates 23, 24 standing substantially normal to the screen 5. The plates 23, 24 may be about 1 cm. wide in their direction normal to screen 5. It will be seen that each of the regions in front of the phosphor strip lies between a pair of plates 23, 24 which can impress an electric field in said space, and that the terminals $R_1$, $R_2$, etc., of electrode 6 can control the electric field in front of all the red phosphors, the terminals $B_1$, $B_2$, etc., on electrode 6 can fix the electric field before all the blue phopshors, and the terminals $G_1$, $G_2$, etc., on electrode 6 can fix the electric field before all the green phosphors.

The scanning beam is focused to span the red, blue and green phosphors constituting a group so that, were no electric fields impressed between any of the plates 23, 24, all three colors would be emitted at the point where the beam strikes screen 5; i. e., a white light would be emitted.

Switches 41, 42 and 43 are synchronized by polyphase source 43A with the picture signals coming in to receiver 12 so that their output electrodes connect the color signals to the particular group of plates 23, 24 on which the scanning beam is, at the particular instant in question, incident. The red color signal at that instant is proportional to the intensity of red light at the spot on the transmitted picture on which the scanning beam is then incident; and this red signal is impressed on the plates 23, 24 to make the intensity with which the receiver scanning beam stimulates the red phosphor at the corresponding point on picture screen 6 proportional to the red color there at the transmitter picture. Switches 42 and 43 act in the same way to control blue and green light stimulation on spot then under bombardment on the receiver screen. Confinement of the potential variations to a small group of plates 23 at any one time reduces the charging current far below the value it would have were all plates 23 connected to filters 27, 28 and 29 simultaneously as in the arrangements of the Miller and the Kruper applications previously mentioned.

As is shown by the above-mentioned Bedford article, satisfactory color pictures are obtained if the modulation frequencies for the respective colors are limited to 1 mc. provided a band of 3 or 4 mc. is provided for modulations of the picture regardless of color. The capacitance inherent in plates 23, 24 is large enough to draw charging currents of awkward size if modulations of 4 mc. are impressed upon them, and to minimize difficulty from this source it is advisable to supply filters 27, 28, 29 of band-limits 0 to 1 mc. ahead of the terminals R, B, and G of electrode 6 since color effects will still be satisfactory when operating within the 0 to 1 mc. band-limits while the charging currents in plates 23, 24 will be reduced. On the other hand, the supply of the full 0 to 4 mc. band, through filter 30, without distinction as to color, modulates the scanning beam with the monochrome detail just mentioned above as desirable. Thus, while the receiver tube of Fig. 1 will be entirely operative where three continuous color modulations of a transmission system, which is of the type not utilizing the above "mixed highs" principle, there is a particular advantage in the combination of my tube with a mixed-high transmission.

The potential variations on the plates 23 have frequencies of the order of 0–1 megacycles and since electric field strengths of considerable magnitude must be impressed between plates 23 and 24 to deflect the electrons of the scanning beam away from the phosphor strips contiguous to the single strip which should at any moment be excited, a charging current of inconvenient magnitude would have to flow through channels 44, 45, 46 except for the fact that the switch-tubes 41, 42, 43 subdivide the control-electrode 6 into sections comprising only a few plates each. The lower the number of plates per section, the lower will be the charging current of course. It follows that our arrangement makes it possible for the receiver designer to reduce the charging current to the control electrodes to readily practicable values by increasing the number of sections into which the control-electrode aggregate is subdivided.

In order to eliminate difficulties due to non-linearity in the sawtooth wave of the vertical sweep generator, it may be desirable that the switch tubes 41, 42, 43 shall connect the channels 44, 45, 46 to the incoming section of control-electrodes 6 before cutting them off from the outgoing section. This can be effected where switch tubes of the rotating electron-beam type previously described are used by defocusing the beam slightly.

It will be evident to those skilled in the art that other arrangements well known may be substituted for the rotating electron-beam switches here described for connecting the control-electrode sections to channels 44, 45, 46 in periodic succession; for example, periodic vibrators or counters may energize grid-controlled tubes one after another to connect the control-electrode sections one after another to the color channels.

While the picture tubes of Figs. 1 and 2 have been described in use on a "mixed highs" or simultaneous system of color-signal transmission, it is usable also on any of the color-sequential transmissions, whether field-sequential, line-sequential or sub-line sequential.

We claim as our invention:

1. A picture-reproducing tube for color pictures comprising a picture screen and an electron beam source for traversing said picture screen, said picture screen comprising a plurality of parallel fluorescent strips divided into groups of adjacent strips each strip of a group capable of emitting a different primary color, a grid member positioned between said electron source and said picture screen, said grid comprising a plurality of conductive members, the totality of said conductive members being divided into a plurality of sections, each section of said gird being associated with a plurality of said groups of fluorescent strips lying adjacent each other, and means for sequentially applying voltages to said sections.

2. A picture-reproducing tube for color pictures comprising a picture screen, an electron beam source, and means for scanning said beam so as to traverse said picture screen, said picture screen comprising a plurality of parallel light-producing strips divided into groups of adjacent strips each strip of a group capable of emitting a different primary color, and a grid member positioned between said electron source and said picture screen, said grid comprising a plurality of parallel conductive members, the totality of said members being divided into a plurality of sections, each of said sections associated with a plurality of groups of light-producing strips lying adjacent each other, and means for sequentially applying voltages to said sections.

3. A picture-reproducing tube for color pictures comprising an electron beam source, a picture screen, and means for deflecting said electron beam so as to scan a raster on said picture screen, said screen comprising a plurality of parallel fluorescent strips divided into groups of adjacent strips each strip of a group capable of emitting a different primary color, a grid member positioned between said electron source and said screen, said grid comprising a plurality of parallel conductive members, the totality of said conductive members being divided into a plurality of sections, each of said sections associated with a plurality of groups of fluorescent strips lying adjacent each other, and means for sequentially applying voltages to selected conductive members of said grid section by section to determine the color reproduction of said tube.

4. A picture-reproducing tube for color pictures comprising a picture screen, an electron beam source for traversing said picture screen, said picture screen comprising a plurality of parallel fluorescent strips arranged in groups, each group including one strip for each primary color, a color control electrode positioned between said picture screen and said electron beam source, including a plurality of parallel conductive members, said control electrode being divided into a plurality of sections, each section operable to control the color produced on a given area of said picture screen, the areas of said picture screen controlled by one of said sections of said control electrode, including a plurality of said groups of fluorescent strips, each section of said control grid being adjacent to the groups of fluorescent strips it controls and means for sequentially applying color signals to said sections of said control grid.

References Cited in the file of this patent

UNITED STATES PATENTS

| | | |
|---|---|---|
| 2,307,188 | Bedford | Jan. 5, 1943 |
| 2,446,440 | Swedlund | Aug. 3, 1948 |
| 2,623,190 | Roth | Dec. 23, 1950 |
| 2,635,203 | Pakswer | Apr. 14, 1953 |
| 2,643,352 | Parker | June 23, 1953 |
| 2,673,890 | Moulton | Mar. 30, 1954 |
| 2,674,650 | Houghton | Apr. 6, 1954 |
| 2,713,604 | Pensak | July 19, 1955 |

FOREIGN PATENTS

| | | |
|---|---|---|
| 443,896 | Great Britain | Mar. 10, 1936 |